Aug. 10, 1965    J. G. FELDKAMP    3,199,689
DUNNAGE DEVICE
Filed Dec. 23, 1960

INVENTOR.
John G. Feldkamp
BY William P. Porcelli
Atty

United States Patent Office 3,199,689
Patented Aug. 10, 1965

3,199,689
DUNNAGE DEVICE
John G. Feldkamp, Homewood, Ill., assignor to Interlake Steel Corporation, a corporation of New York
Filed Dec. 23, 1960, Ser. No. 77,986
3 Claims. (Cl. 214—10.5)

This invention relates to the art of shoring merchandise and particularly to an improved shoring or dunnage device.

Patent No. 2,674,206, issued to Carl William Scott on April 6, 1954, shows and describes an inflatable resilient bag-type member which is used as a shoring or dunnage device between merchandise and the walls of an transportation vehicle in which the merchandise is stored for shipment. The object of the bag-type member is to provide a simple means for impact resistant loading with a minimum of labor required.

One of the major disadvantages of the bag-type members described in that patent is their relatively large expense because they are made of rubber and other expensive materials in order to enable them to be used repeatedly. Because they are for repeated use, they must be shipped back and forth between uses. Their initial cost plus the additional freight charges for return shipping makes the system with these members very costly. It is the principal object of this invention to provide a substitute for the rubber bag members by providing a bag manufactured of such inexpensive materials that it can be discarded after a single use, even though durable enough for limited repeated use.

In order to accomplish this most important objective, an inflatable bag is provided with a construction having an inner plastic bag acting as a bladder or air containing member and outside strength providing layers of relatively strong and inexpensive materials, such as layers consisting of burlap, sisal, rayon and paper.

Other objects and advantages of the invention should be apparent upon reference to the accompanying drawings, in which.

The general manner of employing the improved dunnage bag 1 of this invention is to position the bags 1 between the loads 2 of merchandise and the walls 3 against which the loads 2 would contact if no bags 1 were present and the loads 2 were allowed to shift under impact. These bags 1 are positioned in these zones as mentioned and shown in FIG. 1 and are then inflated to cause them to bulge outwardly against the loads and walls. These bags are preferably of sizes of about two feet by four feet and four feet by nine feet and are inflated at pressures of from about one-half to five pounds per square inch.

Figure 4:
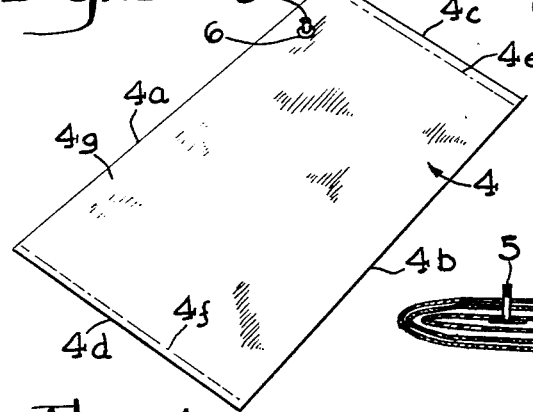
FIG. 4 shows the airtight bladder member used within the bag of FIGS. 2 and 3.

The airtight bladder 4 used inside the bag 1 is preferably made of a tube of polyethylene plastic of about eight to ten thousandths of an inch thick and initially it is flattened into a double layer condition as shown in FIG. 4 which is, in effect, two layers of the material with its lateral edges 4a and 4b continuous. Both the forward end 4c and the rear end 4d are heat sealed together along lines 4e and 4f. With these ends 4c and 4d sealed, the flattened tube is in the shape of a flat enclosure which is then airtight. A conventional air valve 5 can be heat sealed at its base 6 to the upper layer 4g of the bladder 4.

Figure 5:
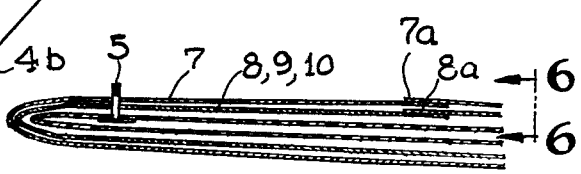
FIG. 5 shows a section along the line 5—5 of FIG. 3 and shows the relationship of the various wall layers of the bag.
Figure 6:
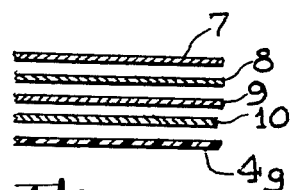
FIG. 6 is a sectional view along the line 6—6 of FIG. 5 and shows the component layers of the bag wall.

The bladder is surrounded with multiple layers 7, 8, 9 and 10 of re-enforcing materials. The outer layer 7 can be of waterproofed kraft paper which may be waterproofed with asphalt, polyethylene or any other waterproofing material capable of being applied to and dried on paper. The next three layers can consist of burlap, sisal, rayon or other re-enforced kraft paper to provide strength. These three layers 8, 9 and 10 can be separate from each other, or else they may be glued together and act as a single sheet. In FIG. 5, the three sheets 8, 9 and 10 are indicated as a single sheet because of this possibility and, in FIG. 6, they are shown separated to indicate that possibility.

After the sheets 7, 8, 9 and 10 are wrapped around the bladder 4, they are overlapped as indicated at 7a and 8a where they are glued together. The effect is that the sheets 7, 8, 9 and 10 form a closed tube or covering around the bladder 4 which provides the required strength and toughness to adequately protect the relatively light gauge bladder 4. With the re-enforcing layers wrapped around the bladder 4, single folded U-shaped end pieces 11 and 12 of paper or other flexible material are positioned around the ends of the assembled layers and stitched to the layers 7, 8, 9 and 10 along the lines 11a and 12a. The stitching is necessarily applied beyond the ends 4c and 4d of the bladder 4 so that the bladder is not punctured by the stitching.

The valve 5 is passed, during assembly of the bag, through an opening 13 provided in the layers 7, 8, 9 and 10 to provide access to it externally of the bag.

Figure 1:
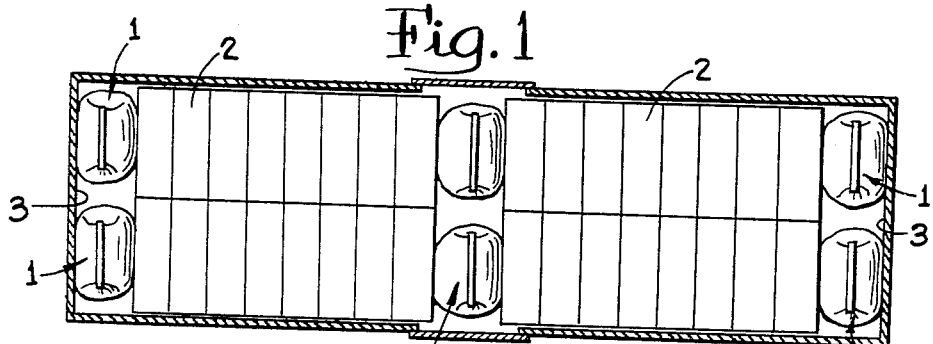
FIG. 1 shows a horizontal cross section of the cargo carrying portion of a transportation vehicle, such as a railroad car, as it would appear beneath the roof of the vehicle looking down onto the top of the load carried by the vehicle.
Figure 2:
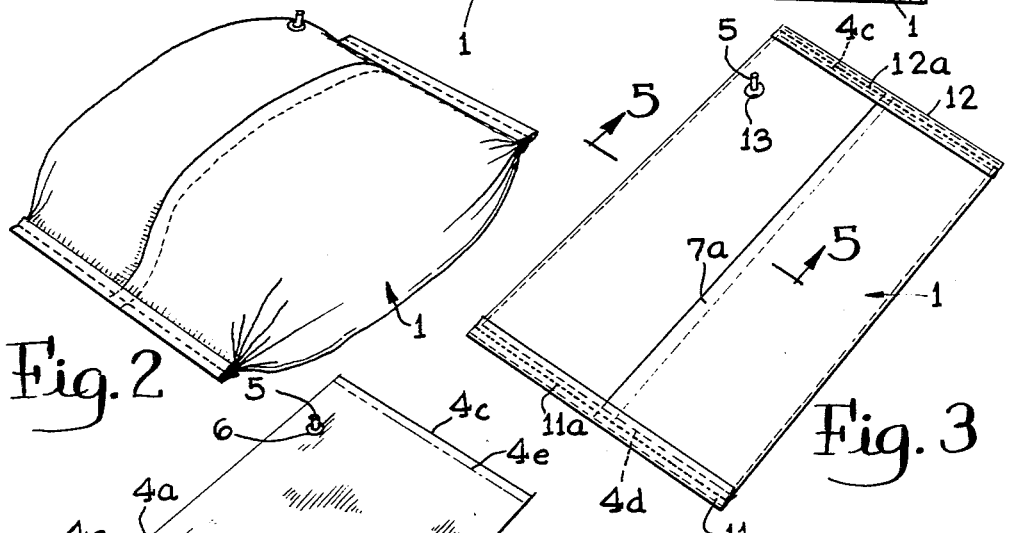
FIG. 2 shows a perspective view of an inflated shoring or dunnage bag manufactured according to this invention.
Figure 3:
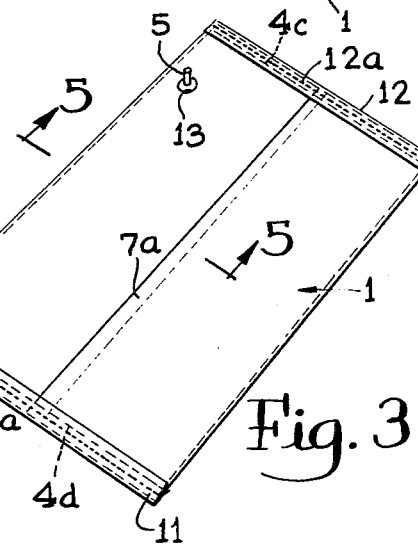
FIG. 3 shows a deflated shoring or dunnage bag made according to this invention.

When the bag 1 is in its final assembled form as shown in FIG. 3, it is then filled with air through the valve 5 to a pressure of about one-half to five pounds per square inch. It is preferable that the bags 1 be positioned between the loads 2 in a transporting vehicle in a manner as shown in FIG. 1 before they are inflated. This allows the bags to press outwardly against the loads 2 and the walls 3 of the vehicle in their proper initial positions so that shifting of the bags, which would otherwise be difficult, is not required.

It should be apparent that what has been shown and described is a dunnage or shoring bag of lightweight and inexpensive materials as compared to one which would be made of heavy and durable re-enforced rubber. It is believed that the bag if this invention can be manufactured at approximately one-tenth of the price of rubber bags so that reuse of the bags is not ordinarily necessary in order to obtain economy of use, although it is believed that reuse is possible to a limited extent.

Although only a single embodiment of the invention has been shown and described, it should be clearly understood that the invention can be manufactured in other ways without departing from the true scope of the invention as defined by the appended claims.

I claim:
1. A pneumatic dunnage device for cushioning a load in a transportation vehicle comprising, a longitudinally-extending, substantially flat tube of relatively thin, flexible, synthetic, thermoplastic film material for providing a discrete inflatable, airtight bladder, a longitudinally-extending, substantially flat tube of strong flexible paper having only two longitudinally-extending natural fold lines therealong so as to preserve its strength, said second-mentioned tube containing said first-mentioned tube, a lateral reinforcing strip at each end extremity of said second-mentioned tube, means securing together the opposite walls of said second-mentioned tube and said reinforcing strips at the respective opposite ends of said second-mentioned tube, and valve means on said first-mentioned tube extending through the side wall of said second-mentioned tube and to the exterior thereof, said first-mentioned tube being inflatable through said valve means, said second-mentioned tube being of a size and the paper thereof being of sufficient strength to provide reinforcing backing for all portions of said first-mentioned tube, when the latter is inflated, to prevent rupture of said first-mentioned tube when said dunnage device is subjected to impacts from the load, the flexibility of said paper of said second-mentioned tube permitting said second-mentioned tube to balloon outwardly in response to pressure in said first-mentioned tube as the latter is inflated.

2. A pneumatic dunnage device for cushioning a load in a transportation vehicle comprising, a longitudinally-extending tube of relatively thin, flexible, synthetic thermoplastic film material sealed at its opposite ends to provide an independent, inflatable, airtight bladder, a longitudinally-extending tube of strong flexible paper loosely containing said first-mentioned tube, stitching means permanently securing together the opposite walls of said second-mentioned tube at the opposite ends thereof and independently of said first-mentioned tube, and a stem on said first-mentioned tube extending through the side wall of said second-mentioned tube and to the exterior thereof, said first-mentioned tube being inflatable through said stem, and the flexible paper of said second-mentioned tube being of sufficient strength to provide reinforcing backing for all portions of said first-mentioned tube, when the latter is inflated, to prevent rupture of said first-mentioned tube when said dunnage device is subjected to impacts from the load.

3. A pneumatic dunnage device for cushioning a load in a transportation vehicle comprising, a longitudinally- extending, substantially-flat tube of relatively thin, flexible, synthetic thermoplastic film material sealed at its opposite ends to provide an independent, inflatable, airtight bladder, a longitudinally-extending, substantially-flat tube of strong flexible paper having only two longitudinally-extending natural fold lines therealong so as to preserve its strength, said second-mentioned tube loosely containing said first-mentioned tube, a lateral reinforcing strip embracing each end extremity of said second-mentioned tube, stitching means permanently securing together the opposite walls of said second-mentioned tube and said reinforcing strips at the respective opposite ends of said second-mentioned tube and independently of said first-mentioned tube, and a stem on said first-mentioned tube extending through the side wall of said second-mentioned tube and to the exterior thereof, said first-mentioned tube being inflatable through said stem, and the flexible paper of said second-mentioned tube being of sufficient strength to provide reinforcing backing for all portions of said first-mentioned tube, when the latter is inflated, to prevent rupture of said first-mentioned tube when said dunnage device is subjected to impacts from the load.

References Cited by the Examiner

UNITED STATES PATENTS

| 1,708,260 | 4/29 | Coovert. | |
| 2,307,902 | 1/43 | Vogt. | |
| 2,500,250 | 3/50 | Hill | 5—339 |
| 2,667,915 | 2/54 | Pfeffer | 5—337 |
| 2,751,140 | 6/56 | Brady | 229—55 |
| 2,774,503 | 12/56 | Moore. | |
| 2,790,592 | 4/57 | Doyle. | |
| 2,856,867 | 10/58 | Dasey | 214—10.5 X |
| 3,072,270 | 1/63 | Tolby | 214—10.5 |

FOREIGN PATENTS 540,564   10/41   Great Britain.

HUGO O. SCHULZ, *Primary Examiner.*

ERNEST A. FALLER, MORRIS TEMIN, *Examiners.*